(12) United States Patent
Maezawa

(10) Patent No.: US 12,119,885 B2
(45) Date of Patent: Oct. 15, 2024

(54) SIGNAL PROCESSING METHOD, SIGNAL PROCESSING DEVICE, AND RECORDING MEDIUM

(71) Applicant: YAMAHA CORPORATION, Hamamatsu (JP)

(72) Inventor: Akira Maezawa, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 166 days.

(21) Appl. No.: 17/979,974

(22) Filed: Nov. 3, 2022

(65) Prior Publication Data

US 2023/0059829 A1 Feb. 23, 2023

Related U.S. Application Data

(63) Continuation of application No. PCT/JP2020/023199, filed on Jun. 12, 2020.

(60) Provisional application No. 63/022,591, filed on May 11, 2020.

(51) Int. Cl.
*H04B 11/00* (2006.01)
(52) U.S. Cl.
CPC .................... *H04B 11/00* (2013.01)
(58) Field of Classification Search
CPC .......... H04R 27/00; H04R 5/04; H04B 11/00; H04M 1/72442
See application file for complete search history.

(56) References Cited

U.S. PATENT DOCUMENTS 10,182,093 B1 1/2019 Oy
2011/0142244 A1* 6/2011 Obata ..................... H04S 7/302
381/17

(Continued)

FOREIGN PATENT DOCUMENTS

JP 2008193561 A 8/2008
JP 2015138040 A 7/2015

OTHER PUBLICATIONS

Office Action issued in Chinese Appln. No. 202080100307.2, mailed Nov. 7, 2023. English machine translation provided.

(Continued)

*Primary Examiner* — Daniel L Murphy
*Assistant Examiner* — Amie M Ndure
(74) *Attorney, Agent, or Firm* — ROSSI, KIMMS & McDOWELL LLP

(57) ABSTRACT

A signal processing method includes: receiving, by a first reception unit, an acoustic signal transmitted via a first transmission path, the acoustic signal received by the first reception unit being a first acoustic signal; receiving, by a second reception unit, the acoustic signal transmitted via a second transmission path different from the first transmission path, the second transmission path having a longer delay time for transmission than the first transmission path, and the acoustic signal received by the second reception unit being a second acoustic signal; calculating, by a delay amount calculation unit, a transmission delay amount that is a relative delay amount between the first acoustic signal and the second acoustic signal; and delaying, by a delay amount addition unit, the first acoustic signal based on the calculated transmission delay amount and outputting the delayed first acoustic signal.

20 Claims, 4 Drawing Sheets

(56) References Cited

U.S. PATENT DOCUMENTS

| | | | | |
|---|---|---|---|---|
| 2012/0087507 | A1* | 4/2012 | Meyer | H04R 27/00 |
| | | | | 381/56 |
| 2014/0328485 | A1* | 11/2014 | Saulters | G06F 3/165 |
| | | | | 381/119 |
| 2017/0277507 | A1* | 9/2017 | Ando | H04R 27/00 |
| 2019/0179597 | A1* | 6/2019 | Tull | H04S 7/301 |
| 2020/0091959 | A1* | 3/2020 | Curtis | H04B 1/7073 |
| 2022/0303715 | A1* | 9/2022 | Watanabe | H04S 7/40 |
| 2023/0059829 | A1* | 2/2023 | Maezawa | H04R 27/00 |
| 2023/0254657 | A1* | 8/2023 | Tsuji | H04S 7/307 |
| | | | | 381/303 |
| 2024/0129669 | A1* | 4/2024 | Tanaka | H04N 21/8106 |

OTHER PUBLICATIONS

English translation of Written Opinion issued in Intl. Appln. No. PCT/JP2020/023199 mailed on Jul. 7, 2020, filed Nov. 3, 2022.

International Search Report issued in Intl. Appln. No. PCT/JP2020/023199 mailed Jul. 7, 2020. English translation provided.

Written Opinion issued in Intl. Appln. No. PCT/JP2020/023199 mailed Jul. 7, 2020.

\* cited by examiner

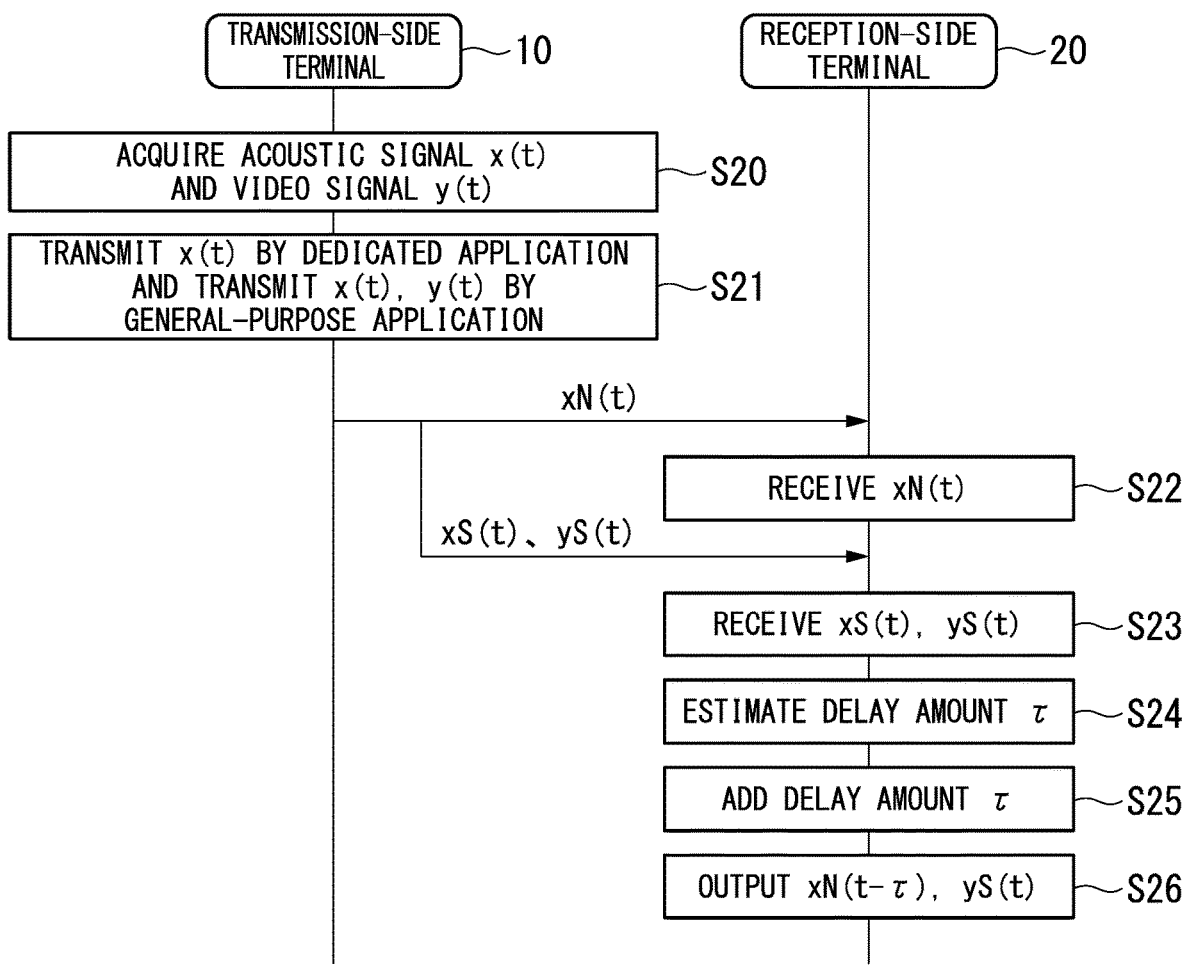

SIGNAL PROCESSING METHOD, SIGNAL PROCESSING DEVICE, AND RECORDING MEDIUM

CROSS-REFERENCE TO RELATED APPLICATIONS

The present application is a continuation application of International Application No. PCT/JP2020/023199, filed Jun. 12, 2020, which claims priority to U.S. Patent Application No. 63/022,591, filed May 11, 2020. The contents of these applications are incorporated herein by reference.

BACKGROUND

Technological Field

The present disclosure relates to a signal processing method, a signal processing device, and a program.

Background Information

There is a demand for conducting online music lessons and remote conferences by connecting remote locations via a network. It is conceivable to provide online music lessons or the like by interlocking video and sound using existing application programs that provide online call services (hereinafter, referred to as call applications) such as Skype (registered trademark).

When conducting communication such as online music lessons, which mainly uses sound, transmission of high-quality sound is required in particular, while suppressing delay. On the other hand, as for video, it is sufficient that sound and video are synchronized, and particularly high image quality is not required. For example, Japanese Unexamined Patent Application, First Publication No. 2015-138040 (hereinafter referred to as Patent Document 1) discloses a technique for increasing the number of participants in a music session while suppressing delay. U.S. patent Ser. No. 10/182,093 (hereinafter referred to as Patent Document 2) discloses a technique for realizing high-quality online musical performances in real time. Japanese Unexamined Patent Application, First Publication No. 2008-193561 (hereinafter referred to as Patent Document 3) discloses a technique for synchronizing a plurality of images.

SUMMARY

However, the internal specifications of existing call applications are generally not disclosed and are black boxes. For this reason, it is generally difficult to apply the techniques disclosed in Patent Documents 1 to 3 to existing call applications.

Since there are already multiple call applications on the market, it is conceivable to select an application suitable for music lessons. General-purpose call applications such as Skype (registered trademark) are widely used, and since most people are accustomed to operating such general-purpose call applications, such applications can be introduced smoothly. However, in such general-purpose call applications, the transmission state of sound and images fluctuates depending on the state of bandwidth, and high-quality sound is not always transmitted. In contrast to this, there are session applications dedicated to acoustic use that enable transmission of performances of both parties with high-quality sound while minimizing transmission delays.

However, since such applications are specialized for acoustic transmission and are rarely used for general calling, general people are not accustomed to operating the applications, making the introduction thereof difficult. Moreover, such applications are not suitable for lessons because such applications handle only sound and no video.

In other words, there is no existing call application or session application that can be easily introduced to a beginner who is about to start playing music and that can transmit high-quality sound. Therefore, there is a problem that use of such applications for online music lessons is difficult.

The present disclosure takes into consideration the above circumstances. Its object is to provide a signal processing method, a signal processing device, and a program capable of transmitting high-quality sound, using a widely used call application.

In order to solve the above problems, a signal processing method of the present disclosure is a signal processing method, including: receiving, by a first reception unit, an acoustic signal transmitted via a first transmission path, the acoustic signal received by the first reception unit being a first acoustic signal; receiving, by a second reception unit, the acoustic signal transmitted via a second transmission path different from the first transmission path, the second transmission path having a longer delay time for transmission than the first transmission path, and the acoustic signal received by the second reception unit being a second acoustic signal; calculating, by a delay amount calculation unit, a transmission delay amount that is a relative delay amount between the first acoustic signal and the second acoustic signal; and delaying, by a delay amount addition unit, the first acoustic signal based on the calculated transmission delay amount and outputting the delayed first acoustic signal.

Moreover, a signal processing device of the present disclosure is a signal processing device, including: a first reception unit configured to receive an acoustic signal transmitted via a first transmission path, the acoustic signal received by the first reception unit being a first acoustic signal; a second reception unit configured to receive the acoustic signal transmitted via a second transmission path different from the first transmission path, the second transmission path having a longer delay time for transmission than the first transmission path, and the acoustic signal received by the second reception unit being a second acoustic signal; a delay amount calculation unit configured to calculate a transmission delay amount that is a relative delay amount between the first acoustic signal and the second acoustic signal; a delay amount addition unit configured to delay the first acoustic signal based on the calculated transmission delay amount; and an output unit configured to output the delayed first acoustic signal.

Furthermore, a recording medium of the present disclosure is a non-transitory computer readable recording medium that stores computer-executable instructions that, when executed, cause the computer to execute: a first reception step of receiving an acoustic signal transmitted via a first transmission path, the acoustic signal received by the first reception unit being a first acoustic signal; a second reception step of receiving the acoustic signal transmitted via a second transmission path different from the first transmission path, the second transmission path having a longer delay time for transmission than the first transmission path, and the acoustic signal received by the second reception unit being a second acoustic signal; a delay amount calculation step of calculating a transmission delay amount that is a relative delay amount between the first acoustic signal and the second acoustic signal; and a delay amount addition step of delaying the first acoustic signal based on the calculated transmission delay amount; and an outputting step of outputting the delayed first acoustic signal.

BRIEF DESCRIPTION OF THE DRAWINGS

FIG. 5 is a sequence diagram showing a processing flow of the transmission system 1A according to the second embodiment.

DETAILED DESCRIPTION OF THE EMBODIMENTS

Hereinafter, transmission systems according to embodiments will be described, with reference to the drawings.

First Embodiment

Figure 1:
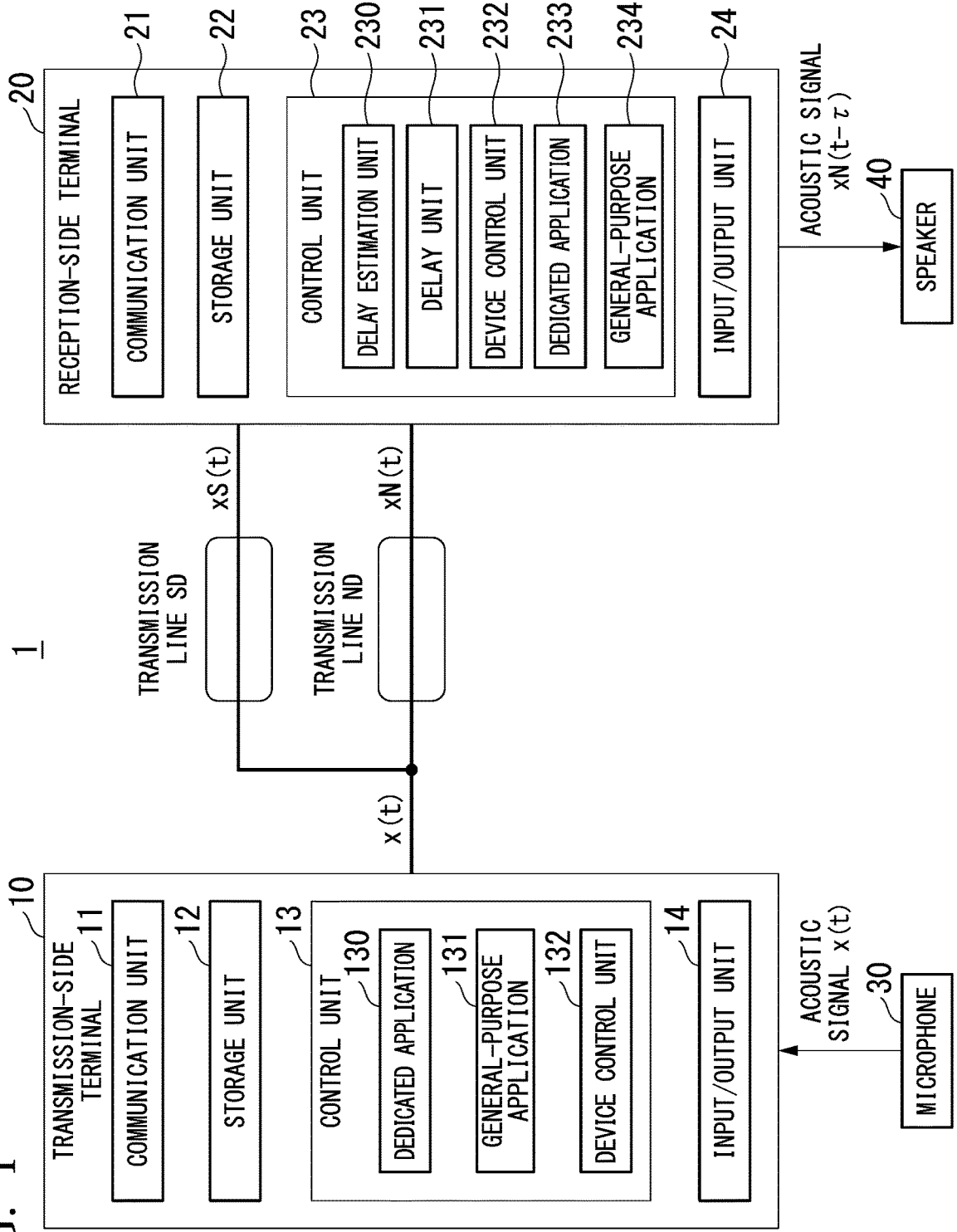
FIG. 1 is a block diagram showing a configuration example of a transmission system 1 according to a first embodiment.

FIG. 1 is a block diagram showing a configuration example of a transmission system 1 according to a first embodiment. The transmission system 1 includes, for example, a transmission-side terminal 10, a reception-side terminal 20, a microphone 30, and a speaker 40. The transmission-side terminal 10 and the reception-side terminal 20 are communicably connected, for example, via a general-purpose communication line such as the Internet.

The transmission system 1 is applied, for example, to a situation where music communication such as an online music lesson is conducted remotely. In such a case, in the transmission system 1, the transmission-side terminal 10 and the reception-side terminal 20 mutually transmit and receive acoustic signals. In the following description, there will be described a case as an example where an acoustic signal x(t) is transmitted from the transmission-side terminal 10 to the reception-side terminal 20. A similar method can be applied also in a case where an acoustic signal is transmitted from the reception-side terminal 20 to the transmission-side terminal 10.

In the present embodiment, two applications, namely a session application and a call application, are installed on both of the transmission-side terminal 10 and the reception-side terminal 20. The session application (hereinafter, referred to as a dedicated application) is an application dedicated to acoustic use. The dedicated application is capable of transmitting high-quality sound while minimizing transmission delays. The call application (hereinafter, referred to as a general-purpose application) is a general-purpose call application such as Skype (registered trademark) that is widely used. However, in such general-purpose applications, the transmission state fluctuates depending on the state of bandwidth, and high-quality sound cannot always be transmitted.

The transmission-side terminal 10 uses both of the session application and the call application to transmit to the reception-side terminal 20 the acoustic signal x(t) in which the same sound source is collected. The reception-side terminal 20 receives the acoustic signal x(t) transmitted from each of the session application and the call application.

Specifically, the reception-side terminal 20 receives an acoustic signal x(t) (hereinafter, referred to as reception acoustic signal xN(t)) transmitted via the dedicated application. Moreover, the reception-side terminal 20 receives an acoustic signal x(t) (hereinafter, referred to as reception acoustic signal xS(t)) transmitted via the general-purpose application.

Here, the dedicated application performs transmission via a transmission path ND. The general-purpose application performs transmission via a transmission path SD. The transmission paths ND, SD generally have different transmission paths. Therefore, the reception-side terminal 20 receives the reception acoustic signal xN(t) and the reception acoustic signal xS(t) at different timings.

Here, since the dedicated application performs transmission with as little delay as possible, the reception acoustic signal xN(t) is received by the reception-side terminal 20 with less delay than the reception acoustic signal xS(t). In such a case, the reception acoustic signal xN(t) is an example of the "first acoustic signal". The transmission path ND is an example of the "first transmission path". Moreover, the reception acoustic signal xS(t) is an example of the "second acoustic signal". The transmission path SD is an example of the "second transmission path".

The reception-side terminal 20 synchronizes and outputs the two acoustic signals received at different timings. The reception-side terminal 20 calculates a relative transmission delay amount between the two acoustic signals. In the following description, a transmission delay amount is simply referred to as a delay amount.

The reception-side terminal 20 uses a calculated delay amount t to generate a reception acoustic signal xN(t−τ) by delaying the reception acoustic signal xN(t), which is the acoustic signal with the smaller delay, by the delay amount τ. Then, the reception-side terminal 20 outputs the reception acoustic signal xN(t−τ) to the speaker 40 instead of the reception acoustic signal xS(t). As a result, it is possible to output high-quality sound in accordance with the timing at which the general-purpose application outputs sound on the reception side. Therefore, a call can be made with high-quality sound via the general-purpose application.

The transmission-side terminal 10 is a computer device on the transmitter side, and is, for example, a smart phone, a personal computer, a mobile phone, a tablet terminal, or a wearable terminal. The transmission-side terminal 10 includes, for example, a communication unit 11, a storage unit 12, a control unit 13, and an input/output unit 14.

The communication unit 11 communicates with the reception-side terminal 20. For example, the communication unit 11 transmits the acoustic signal x(t) to the reception-side terminal 20 under the control of the dedicated application. Moreover, the communication unit 11 transmits the acoustic signal x(t) to the reception-side terminal 20 under the control of the general-purpose application.

The storage unit 12 is configured, for example, with a storage medium such as a HDD (Hard Disk Drive), flash memory, EEPROM (Electrically Erasable Programmable Read Only Memory), RAM (Random Access read/write Memory), ROM (Read Only Memory), or with a combination of any of these storage media. The storage unit 12 stores a program for executing various processes of the transmission-side terminal 10, and temporary data used when performing the various processes.

A processing unit such as a CPU (Central Processing Unit) or a GPU (Graphics Processing Unit) serving as hardware included in the transmission-side terminal 10 executes a program stored in the storage unit 12 to thereby realize functions of the control unit 13.

The control unit 13 includes, for example, a dedicated application 130, a general-purpose application 131, and a device control unit 132. The dedicated application 130 is a functional unit that realizes functions of the general-purpose application, and transmits the acoustic signal x(t) acquired from the microphone 30 to a preliminarily set communication destination device (here, the reception-side terminal 20). The general-purpose application 131 is a functional unit that realizes functions of the general-purpose application, and transmits the acoustic signal x(t) acquired from the microphone 30 to a preliminarily set communication destination device (here, the reception-side terminal 20). The device control unit 132 controls the transmission-side terminal 10 in a centralized manner. For example, the device control unit 132 outputs the acoustic signal x(t) input from the microphone 30 to the dedicated application 130 and the general-purpose application 131. Moreover, the device control unit 132 outputs to the communication unit 11 a control signal for establishing communication with a communication destination device, which is output from the dedicated application 130 and the general-purpose application 131, to thereby transmit it to the reception-side terminal 20.

The input/output unit 14 is a functional unit that mediates signal input/output with an external device connected to the transmission-side terminal 10. Here, the input/output unit 14 receives the acoustic signal x(t) collected by the microphone 30.

The reception-side terminal 20 is a computer device on the receiver side, and is, for example, a smart phone, a personal computer, a mobile phone, a tablet terminal, or a wearable terminal. Here, the reception-side terminal 20 is of a configuration equivalent to that of the transmission-side terminal 10. In the following description, only the functions of the reception-side terminal 20 that are different from those of the transmission-side terminal 10 will be described, and detailed descriptions of the functions equivalent to those of the transmission-side terminal 10 may be omitted.

The reception-side terminal 20 includes, for example, a communication unit 21, a storage unit 22, a control unit 23, and an input/output unit 24. The communication unit 21 communicates with the transmission-side terminal 10. For example, the communication unit 21 receives the reception acoustic signal xN(t) from the transmission-side terminal 10. The communication unit 21 receives the reception acoustic signal xS(t) from the transmission-side terminal 10.

The storage unit 22 is configured, for example, with a storage medium such as a HDD, flash memory, EEPROM, RAM, ROM, or with a combination of any of these storage media. The storage unit 22 stores a program for executing various processes of the reception-side terminal 20, and temporary data used when performing the various processes.

A processing unit such as a CPU or a GPU serving as hardware included in the reception-side terminal 20 executes a program stored in the storage unit 22 to thereby realize functions of the control unit 23.

The input/output unit 24 is a functional unit that mediates signal input/output with an external device connected to the reception-side terminal 20. Here, the input/output unit 24 outputs the reception acoustic signal xN(t−τ) to the speaker 40.

The control unit 23 includes, for example, a delay estimation unit 230, a delay unit 231, a device control unit 232, a dedicated application 233, and a general-purpose application 234. The delay estimation unit 230 is an example of the "delay amount calculation unit". The delay unit 231 is an example of the "delay amount addition unit". The device control unit 232 controls the reception-side terminal 20 in a centralized manner. The dedicated application 233 is a functional unit equivalent to the dedicated application 130. The general-purpose application 234 is a functional unit equivalent to the general-purpose application 131.

Figure 2:
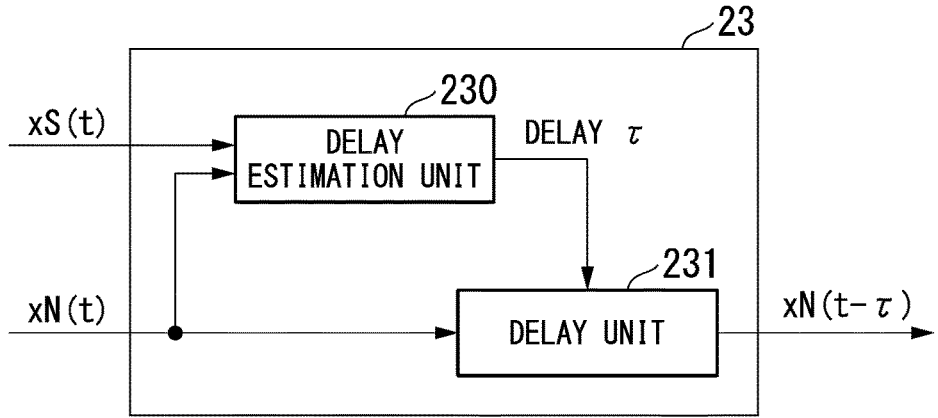
FIG. 2 is a diagram for describing processing performed by a control unit 23 according to the first embodiment.

FIG. 2 is a diagram for describing processing performed by the control unit 23. The delay estimation unit 230 acquires the reception acoustic signal xN(t) and the reception acoustic signal xS(t) and calculates the relative delay amount τ between the two signals. The delay estimation unit 230 outputs the calculated delay amount τ to the delay unit 231.

The delay unit 231 generates a reception acoustic signal xN(t−τ) by delaying the reception acoustic signal xN(t), using the delay amount τ acquired from the delay estimation unit 230, and outputs the generated reception acoustic signal xN(t−τ).

Here, a specific method of the delay estimation unit 230 to calculate the delay amount will be described. The delay estimation unit 230, for example, buffers the reception acoustic signal xN(t) for a certain time section (for example, 1 second). That is to say, the delay estimation unit 230 sequentially stores the reception acoustic signal xN(t) received by the communication unit 21, and temporarily stores the signal corresponding to the certain time section, for example, in the storage unit 22.

Moreover, the delay estimation unit 230, for example, buffers the reception acoustic signal xS(t) for a certain time section (for example, 1 second). That is to say, the delay estimation unit 230 sequentially stores the reception acoustic signal xS(t) received by the communication unit 21, and temporarily stores the signal corresponding to the certain time section, for example, in the storage unit 22.

The delay estimation unit 230 obtains a cross-correlation value between the buffered reception acoustic signal xN(t) in a certain time section T and the reception acoustic signal xS(t). For example, the delay estimation unit 230 calculates a cross-correlation value R, using Equation (1) below. In Equation (1), R(n) indicates the cross-correlation value where n is a delay amount. T indicates a certain time section, and t indicates time.

$$R(n) = \sum_{i=t-T}^{t-n} xN(i) xS(i+n) \qquad \text{EQ. (1)}$$

For example, the delay estimation unit 230 calculates the cross-correlation value R(n) while changing n. Of the calculated cross-correlation values R(n), the delay estimation unit 230 takes the delay amount n that maximizes the absolute value |R(n)| as the relative delay amount between the reception acoustic signal xN(t) and the reception acoustic signal xS(t).

Moreover, the delay estimation unit 230 may use the weighted sum of cross-correlation values R'(n) as the cross-correlation value R(n) as shown in Equation (2) below. The cross-correlation value R'(n) here is a cross-correlation value obtained most recently (for example, during the previous time section). In Equation (2), R'(n) is the most recent cross-correlation value and indicates the cross-correlation value where the delay amount is n. T indicates a certain time section, and t indicates time.

$$R(n) = a|R'(n)| + \left|\sum_{i=t-T}^{t\,n} xN(i)xS(i+n)\right| \qquad \text{EQ. (2)}$$

Here, the amount of delay due to the transmission path ND or the transmission path SD does not always take a constant value, and usually fluctuates from moment to moment, depending on the band state and the degree of congestion of signals being transmitted and received. Therefore, even if the reception acoustic signal xN(t) is delayed using the calculated delay amount, the reception acoustic signal xN(t) and the reception acoustic signal xS(t) may gradually become out of sync.

As a countermeasure against this, the delay estimation unit 230 updates the delay amount where appropriate. For example, the delay estimation unit 230 calculates the delay amount each time a predetermined calculation timing arrives. The delay estimation unit 230 stores the calculated delay amounts in the storage unit 22 as delay amounts n(1), n(2), . . . , n(N), for example. The argument (1, 2, . . . , N) of the delay amount n indicates a calculation timing. The delay estimation unit 230 sets the delay amount n(k) obtained at each calculation timing k (k=1 to N) as the delay amount at that point in time. As a result, even in a case where the delay amount associated with transmission changes from moment to moment, it is still possible to output a reception acoustic signal xN(t) that follows the changes.

The calculation timing may be set arbitrarily. For example, the delay amount may be calculated each time the reception acoustic signal xN(t) or the reception acoustic signal xS(t) is received. Alternatively, the calculation timing may arrive for each buffering time section T (or ½T, ¼T, and so forth), or the calculation timing may arrive randomly.

In the above description, the case has been described as an example where the reception acoustic signal xN(t) is delayed by a calculated delay amount each time the delay amount is calculated. However, it is not limited to this example. For example, on the basis of a delay amount calculated by the delay estimation unit 230, the delay unit 231 may determine whether or not to delay the reception acoustic signal xN(t) by the calculated delay amount, that is, whether or not to update the delay amount.

For example, the delay unit 231 acquires a reference value nf that is a reference delay amount preliminarily stored in the storage unit 22 or the like. The delay unit 231 uses the acquired reference value nf and the calculated delay amount n(k) to determine whether or not to update the delay amount of the reception acoustic signal xN(t) by the calculated delay amount n(k). For example, the delay unit 231 determines to update the delay amount when the absolute value of the difference |nf−n(k)| between the reference value nf and the delay amount n(k) is equal to or greater than a predetermined threshold value (allowable range described later). The delay unit 231 determines not to update the delay amount when the absolute value |nf−n(k)| is less than the predetermined threshold value. Alternatively, the delay unit 231 may set the delay amount as the reference value nf when the absolute value |nf−n(k)| is less than the predetermined threshold value.

In other words, the delay unit 231 determines to update the delay amount if the delay amount n(k) is greater than (reference value nf+allowable range) or is smaller than (reference value nf−allowable range). The delay unit 231 determines not to update the delay amount if the delay amount n(k) is smaller than (reference value nf+allowable range) and is greater than (reference value nf−allowable range). The (reference value nf+allowable range) in such a case is an example of the "first threshold value". As a result, the delay amount can be updated only if the calculated delay amount n(k) exceeds the allowable range from the currently set value. Therefore, it is possible to follow the actual change in the delay amount while suppressing minute changes in the delay amount and reducing the occurrence of acoustic discomfort.

In the above description, the case has been described as an example where the reference value nf is a fixed value. However, it is not limited to this example. The reference value nf may be a variable value. For example, the delay estimation unit 230 may set the reference value nf as an average of delay amounts n(1), n(2), . . . , n(N) calculated at respective calculation timings. The average may be a simple addition average value from calculation timings 1 to N, or may be a weighted average value. Alternatively, it may be the most recent moving average. Where the latest delay amount is n(N), the most recent moving average is the average value of the delay amount n(N) and a plurality of the most recent delay amounts (for example, the delay amounts n(N−1), n(N−2) at calculation timings N−1, N−2).

Moreover, in the case where the delay amount is updated (changed), the delay unit 231 may change it in a stepwise manner so that the change is smooth. For example, when updating the delay amount, the delay unit 231 first calculates the difference between the current delay amount and the updated delay amount as a change amount. The delay unit 231 keeps the rate of change (the amount of change per unit time) from exceeding a predetermined threshold value on the basis of the calculated change amount. As a result, the delay unit 231 can gradually change the delay amount, and can suppress the occurrence of sound interruptions, sound skips, and the like.

In the above description, there has been described the case as an example where the delay estimation unit 230 takes the delay amount n that makes the absolute value of the cross-correlation value |R(n)| the peak value (maximum value) as the relative delay amount between the reception acoustic signal xN(t) and the reception acoustic signal xS(t).

However, in the case where an acoustic signal that is nearly silent is transmitted, the overall signal amplitude of the received acoustic signal is smaller than that in the case of a non-silent acoustic signal. In this case, it is conceivable that the cross-correlation value R(n) does not have a prominent peak value and that similar cross-correlation values are obtained regardless of the value of the delay amount n. In such a case, the value of n that maximizes the cross-correlation value R(n) is highly likely to be unreliable as an actual delay amount.

As a countermeasure against this, in the case where the peak value of the cross-correlation value R(n) is less than a predetermined threshold value, the delay estimation unit 230 determines not to employ the corresponding delay amount n as an actual delay amount. That is to say, in the case where the peak value of the cross-correlation value R(n) is equal to or greater than the predetermined threshold value, the delay estimation unit 230 determines to employ the corresponding delay amount n as an actual delay amount. As a result, the delay estimation unit 230 can accurately calculate the delay amount.

Furthermore, transmission of a signal through either the transmission path SD or the transmission path ND may be interrupted for some reason. In such a case, a delay amount calculated using the cross-correlation value R(n) is not reliable. As a countermeasure against this, the delay estimation unit 230 determines whether or not the transmission paths are interrupted, and if one of the transmission paths is determined as having been interrupted, the delay estimation unit 230 does not calculate the cross-correlation value R(n).

For example, the delay estimation unit 230 calculates the power (maximum level) of each of the buffered reception acoustic signal xS(t) and the reception acoustic signal xN(t). The power mentioned here is an index of the strength of a buffered signal. The power may be, for example, the sum of the absolute values of the signal amplitudes in the buffered signals, or the signal amplitude value of the signal with the maximum absolute value of the signal amplitudes among the buffered signals.

If one of the calculated powers of the reception acoustic signal xS(t) and the reception acoustic signal xN(t) exceeds a predetermined threshold value and the other is below the threshold value, the delay estimation unit 230 determines the transmission path where the power is below the threshold value as being interrupted. The threshold value mentioned here is an example of the "second threshold value".

Specifically, if the power of the reception acoustic signal xN(t) is less than the threshold value, and the power of the reception acoustic signal xS(t) is equal to or greater than the threshold value, the delay estimation unit 230 determines not to calculate the cross-correlation value R(n) and not to calculate the delay amount. Moreover, if the power of the reception acoustic signal xN(t) is equal to or greater than the threshold value, and the power of the reception acoustic signal xS(t) is less than the threshold value, the delay estimation unit 230 determines not to calculate the cross-correlation value R(n) and not to calculate the delay amount.

If signal transmission via either the transmission path SD or the transmission path ND is determined as being interrupted, the delay estimation unit 230 may reproduce the acoustic signal of the uninterrupted transmission. Specifically, if the power of the reception acoustic signal xN(t) is less than the threshold value, and the power of the reception acoustic signal xS(t) is equal to or greater than the threshold value, the delay estimation unit 230 causes the reception acoustic signal xS(t) to be output from the speaker 40 via the input/output unit 24. Moreover, if the power of the reception acoustic signal xN(t) is equal to or greater than the threshold value, and the power of the reception acoustic signal xS(t) is less than the threshold value, the delay estimation unit 230 causes the reception acoustic signal xN(t−τ) to be output from the speaker 40 via the input/output unit 24. The delay amount τ here is the currently set delay amount. As a result, the delay estimation unit 230 can continue sound reproduction even if one of the transmission paths is interrupted.

Figure 3:
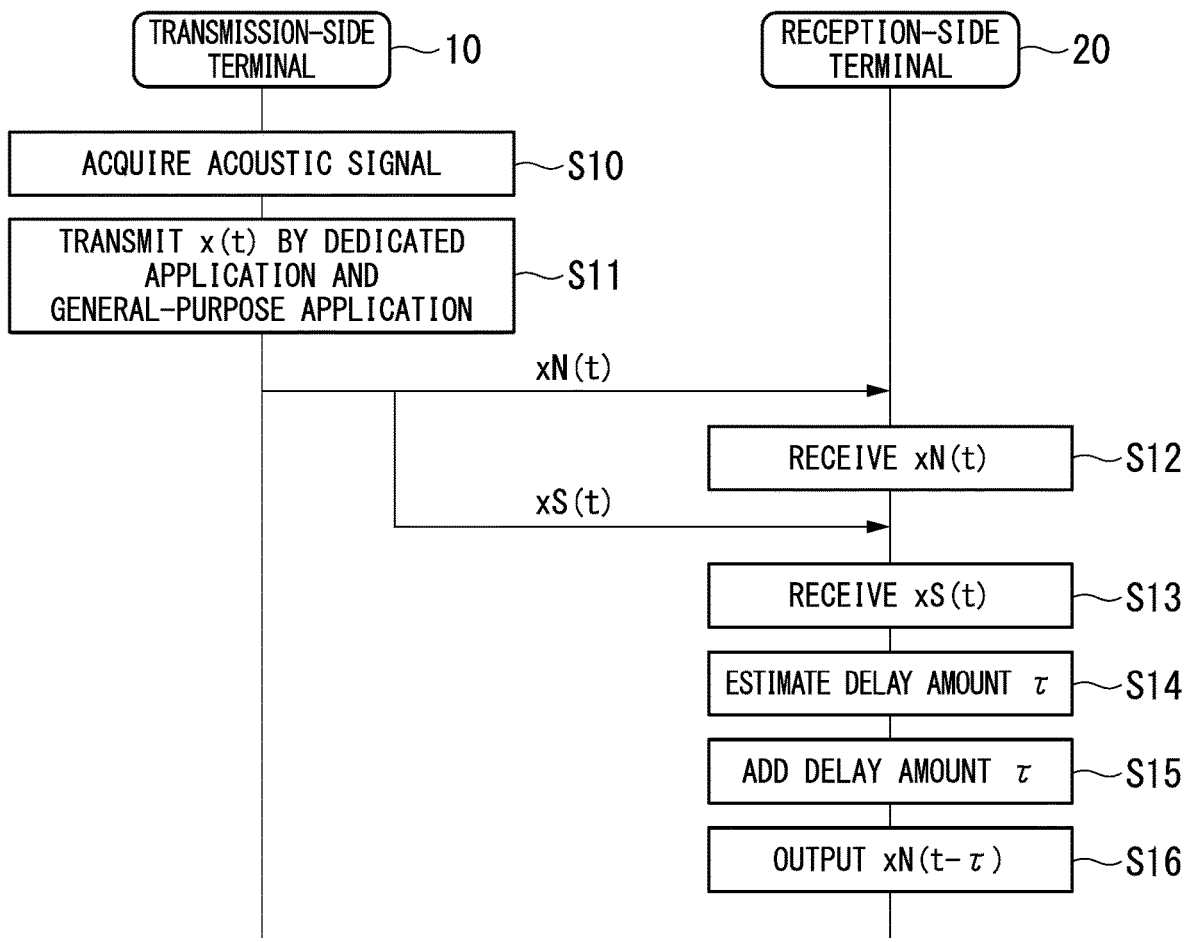
FIG. 3 is a sequence diagram showing a processing flow of the transmission system 1 according to the first embodiment.

FIG. 3 is a sequence diagram showing a processing flow of the transmission system 1 according to the first embodiment. The transmission-side terminal 10 acquires an acoustic signal x(t) from the microphone 30 (Step S10). The transmission-side terminal 10 transmits the acoustic signal x(t) to the reception-side terminal 20 by each of the dedicated application and the general-purpose application (Step S11). The acoustic signal x(t) via the dedicated application reaches the reception-side terminal 20 as a reception acoustic signal xN(t) via the transmission path ND. The acoustic signal x(t) via the general-purpose application reaches the reception-side terminal 20 as a reception acoustic signal xS(t) via the transmission path SD.

The reception-side terminal 20 receives the reception acoustic signal xN(t) (Step S12). The reception-side terminal 20 receives the reception acoustic signal xS(t) (Step S13). The reception-side terminal 20 uses the reception acoustic signal xN(t) and the reception acoustic signal xS(t) having been received to estimate (calculate) the delay amount τ (Step S14). The reception-side terminal 20 uses the estimated delay amount τ to delay the reception acoustic signal xN(t), and outputs the delayed reception acoustic signal xN(t−τ) to the speaker 40 (Step S16).

As described above, the transmission method by means of the transmission system 1 of the first embodiment is a transmission method for a reception acoustic signal xN(t) and a reception acoustic signal xS(t) of the same sound source. The transmission method is an example of the "signal processing method". The reception acoustic signal xN(t) is an example of the "first acoustic signal". The reception acoustic signal xS(t) is an example of the "second acoustic signal".

In the transmission method by means of the transmission system 1, the communication unit 21 receives the reception acoustic signal xN(t) transmitted via the transmission path ND. The communication unit 21 is an example of the "first reception unit". The transmission path ND is an example of the "first transmission path". The communication unit 21 receives the reception acoustic signal xS(t) transmitted via the transmission path SD. The communication unit 21 is an example of the "second reception unit". The transmission path SD is a transmission path having a longer transmission delay time than the transmission path ND, and is an example of the "second transmission path". The delay estimation unit 230 calculates the relative delay amount τ between the reception acoustic signal xN(t) and the reception acoustic signal xS(t). The delay estimation unit 230 is an example of the "delay amount calculation unit". The delay amount τ is an example of the "transmission delay amount". The delay unit 231 causes the reception acoustic signal xN(t) to be delayed on the basis of the calculated delay amount τ, and outputs the delayed reception acoustic signal xN(t−τ).

As a result, in the transmission system 1 of the first embodiment, high-quality sound can be output at a timing synchronized with the sound output from the general-purpose application. Therefore, it is possible to transmit high-quality sound, using a widely used call application.

Moreover, in the transmission method by means of the transmission system 1 of the first embodiment, the delay estimation unit 230 calculates the delay amount τ each time a predetermined calculation timing k arrives. Each time the delay amount τ is calculated, the delay unit 231 delays the reception acoustic signal xN(t) by the currently calculated delay amount τ. The delay unit 231 outputs the delayed reception acoustic signal xN(t−τ). As a result, in the transmission method by means of the transmission system 1 of the first embodiment, even in the case where the delay amount changes from moment to moment, it is still possible to follow the change and continue to output the reception acoustic signal xN(t) that is in synchronization with the reception acoustic signal xS(t).

Furthermore, in the transmission method by means of the transmission system 1 of the first embodiment, each time the delay amount is calculated, the delay unit 231 determines whether or not the currently calculated delay amount τ is equal to or greater than the threshold value (first threshold value). If the currently calculated delay amount τ is equal to or greater than the threshold value, the delay unit 231 delays the reception acoustic signal xN(t) by the currently calculated delay amount τ. The delay unit 231 outputs the delayed reception acoustic signal xN(t−τ). As a result, when a significant change occurs in the delay amount, the change can be followed.

Furthermore, in the transmission method by means of the transmission system 1 of the first embodiment, each time the delay amount τ is calculated, the delay unit 231 determines whether or not the currently calculated delay amount τ is equal to or greater than the threshold value (first threshold value). If the currently calculated delay amount τ is not equal to or greater than the threshold value, the delay unit 231 delays the reception acoustic signal xN(t) by a predetermined delay amount (for example, reference value nf). The delay unit 231 outputs the delayed reception acoustic signal xN(t−nf). As a result, it is possible to reduce the occurrence of acoustic discomfort by suppressing minute changes in the delay amount.

Moreover, in the transmission method by means of the transmission system 1 of the first embodiment, the threshold value (first threshold value) is an average of delay amounts n(k) calculated each time a predetermined calculation timing k arrives. As a result, if there is a significant change in the currently calculated delay amount compared to the average of delay amounts observed up until this point, the change will be followed, and if the currently calculated delay amount is similar to the delay amounts observed up until this point, the delay amount can be maintained as it is as the change is minute. Therefore, the same effects as those described above can be exhibited.

Furthermore, in the transmission method by means of the transmission system 1 of the first embodiment, each time the delay amount τ is calculated, the delay unit 231 delays the reception acoustic signal xN(t) in a stepwise manner on the basis of the previously calculated delay amounts and the currently calculated delay amount. As a result, it is possible to gradually change the delay amount and suppress the occurrence of sound interruptions, sound skips, and the like.

Moreover, in the transmission method by means of the transmission system 1 of the first embodiment, the delay estimation unit 230 calculates the delay amount n that maximizes the cross-correlation value R(n) between the time-series variation of the reception acoustic signal xN(t) and the time-series variation of the reception acoustic signal xS(t), received in a predetermined time section T. If the calculated delay amount is equal to or greater than the threshold value (second threshold), the delay estimation unit 230 sets the calculated delay amount n as the delay amount τ. As a result, in the case where the calculated delay amount is unreliable, such as when a silent state continues, it is possible to prevent the unreliable delay amount from being applied.

Moreover, in the transmission method by means of the transmission system 1 of the first embodiment, if the calculated delay amount is equal to or greater than the threshold value (second threshold), the delay estimation unit 230 sets the calculated delay amount n as the delay amount τ. If the calculated delay amount is less than the threshold value (second threshold), the delay estimation unit 230 does not set the calculated delay amount n as the delay amount τ. As a result, in the case where the calculated delay amount is unreliable, such as when a silent state continues, it is possible to prevent the unreliable delay amount from being applied.

Furthermore, in the transmission method by means of the transmission system 1 of the first embodiment, the delay estimation unit 230 does not calculate the delay amount if the maximum level of the reception acoustic signal xN(t) received in the predetermined time section T is equal to or greater than the the threshold value (second threshold value) and the maximum level of the reception acoustic signal xS(t) is less than the threshold value (second threshold value). The delay estimation unit 230 does not calculate the delay amount if the maximum level of the reception acoustic signal xN(t) received in the predetermined time section T is less than the the threshold value (second threshold value) and the maximum level of the reception acoustic signal xS(t) is equal to or greater than the threshold value (second threshold value). As a result, in the case where the calculated delay amount is unreliable, such as when one of the transmission paths is interrupted, it is possible to prevent the unreliable delay amount from being applied.

Second Embodiment

Next, a second embodiment will be described. The present embodiment differs from the embodiment described above in that the general-purpose application transmits a video signal y(t) together with an acoustic signal x(t).

Figure 4:
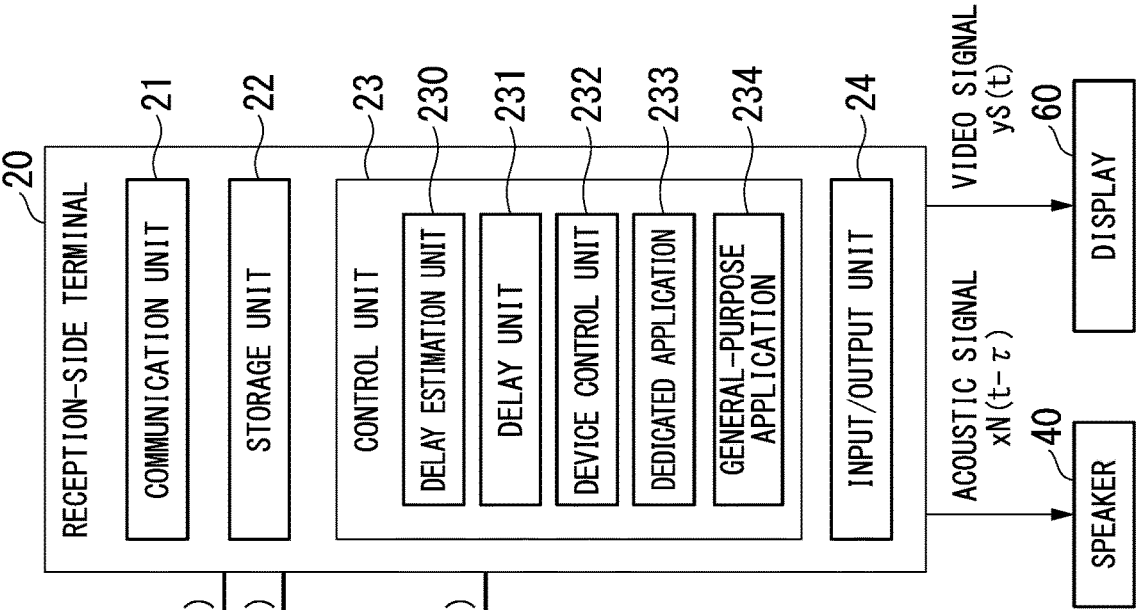
FIG. 4 is a block diagram showing a configuration example of a transmission system 1A according to a second embodiment.
Figure 4:
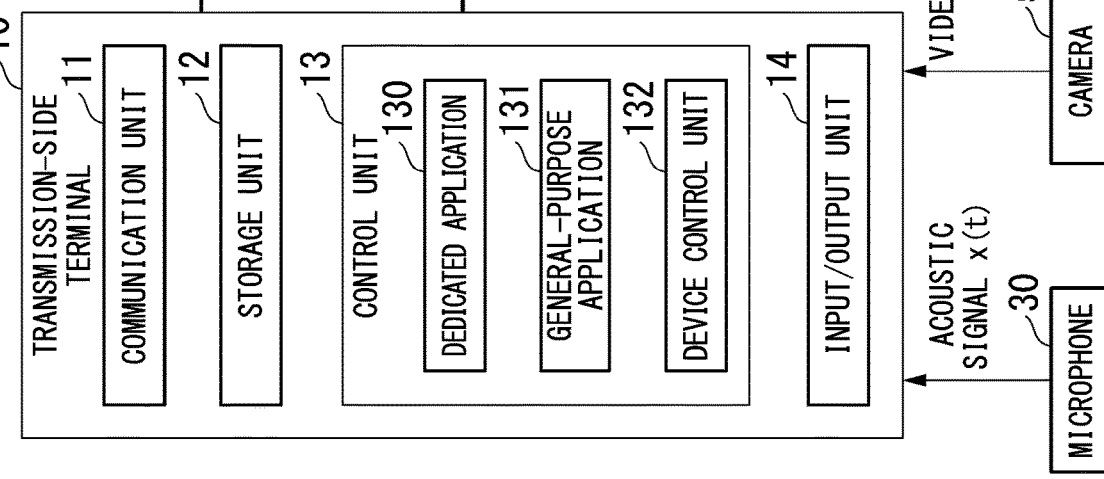

FIG. 4 is a block diagram showing a configuration example of a transmission system 1A according to the second embodiment. In the transmission system 1A, a camera 50 is connected to the transmission-side terminal 10. Moreover, in the transmission system 1, a display 60 is connected to the reception-side terminal 20.

The transmission-side terminal 10 acquires the acoustic signal x(t) from the microphone 30 via the input/output unit 14. Moreover, the transmission-side terminal 10 acquires the video signal y(t) from the camera 50 via the input/output unit 14. The transmission-side terminal 10 transmits the acoustic signal x(t) via the dedicated application to the reception-side terminal 20 by means of the dedicated application 130. Moreover, the transmission-side terminal 10 transmits the acoustic signal x(t) and the video signal y(t) via the general-purpose application to the reception-side terminal 20 by means of the general-purpose application 131.

The reception-side terminal 20 receives the reception acoustic signal xN(t) via the transmission path ND. Also, the reception-side terminal 20 receives the reception acoustic signal xS(t) and the video signal yS(t) via the transmission path SD. For the reception acoustic signal xN(t), the delay estimation unit 230 calculates the relative delay amount τ between the reception acoustic signal xN(t) and the reception acoustic signal xS(t). The reception-side terminal 20 outputs the reception acoustic signal xN(t−τ), which has been delayed by the calculated delay amount τ, to the speaker 40 via the input/output unit 24. The reception-side terminal 20 outputs the received video signal yS(t) to the display 60 via the input/output unit 24.

FIG. 5 is a sequence diagram showing a processing flow of the transmission system 1A according to the second embodiment. The transmission-side terminal 10 acquires an acoustic signal x(t) from the microphone 30 and acquires a video signal y(t) from the camera 50 (Step S20). The transmission-side terminal 10 transmits the acoustic signal x(t) to the reception-side terminal 20 by means of the dedicated application and transmits the acoustic signal x(t) and the video signal y(t) to the reception-side terminal 20 by means of the general-purpose application (Step S21). The acoustic signal x(t) via the dedicated application reaches the reception-side terminal 20 as a reception acoustic signal xN(t) via the transmission path ND. The acoustic signal x(t) and the video signal y(t) via the general-purpose application reach the reception-side terminal 20 as a reception acoustic signal xS(t) and a reception video signal yS(t) via the transmission path SD.

The reception-side terminal 20 receives the reception acoustic signal xN(t) (Step S22). The reception-side terminal 20 receives the reception acoustic signal xS(t) and the reception video signal yS(t) (Step S23). The reception-side terminal 20 uses the reception acoustic signal xN(t) and the reception acoustic signal xS(t) having been received to estimate (calculate) the delay amount τ (Step S24). The reception-side terminal 20 uses the estimated delay amount τ to delay the reception acoustic signal xN(t), and outputs the delayed reception acoustic signal xN(t−τ) to the speaker 40 and outputs the reception video signal yS(t) to the display 60 (Step S26).

As described above, the transmission method by means of the transmission system 1A of the second embodiment is a transmission method for a reception acoustic signal xN(t) and a reception acoustic signal xS(t) in which acoustic signals x(t) of the same sound source are collected.

In the transmission method by means of the transmission system 1A, the communication unit 21 receives the reception acoustic signal xN(t) transmitted via the transmission path ND. The communication unit 21 receives the reception acoustic signal xS(t) and the reception video signal yS(t) transmitted via the transmission path SD. The delay estimation unit 230 calculates the relative delay amount τ between the reception acoustic signal xN(t) and the reception acoustic signal xS(t). The delay unit 231 causes the reception acoustic signal xN(t) to be delayed on the basis of the calculated delay amount τ, and outputs the delayed reception acoustic signal xN(t−τ).

As a result, in the transmission system 1A of the second embodiment, high-quality sound can be reproduced in synchronization with the video transmitted by means of the general-purpose application. Therefore, it is possible to transmit high-quality sound, using a widely used call application.

As described above, according to the present disclosure, it is possible to transmit high-quality sound, using a widely used call application.

According to the embodiments exemplified above, it is possible to provide a transmission system that is applied to online music lessons and the like.

What is claimed is:

1. A signal processing method, comprising:
receiving, by a first reception unit, an acoustic signal transmitted via a first transmission path, the acoustic signal received by the first reception unit being a first acoustic signal;
receiving, by a second reception unit, the acoustic signal transmitted via a second transmission path different from the first transmission path, the second transmission path having a longer delay time for transmission than the first transmission path, and the acoustic signal received by the second reception unit being a second acoustic signal;
calculating, by a delay amount calculation unit, a transmission delay amount that is a relative delay amount between the first acoustic signal and the second acoustic signal; and
delaying, by a delay amount addition unit, the first acoustic signal based on the calculated transmission delay amount and outputting the delayed first acoustic signal.

2. The signal processing method according to claim 1, further comprising receiving, by the second reception unit, a video signal transmitted via the second transmission path along with the acoustic signal.

3. The signal processing method according to claim 1, wherein the delay amount calculation unit calculates the transmission delay amount each time a predetermined calculation timing arrives, and
wherein the delay amount addition unit delays the first acoustic signal using the calculated transmission delay amount each time the transmission delay amount is calculated.

4. The signal processing method according to claim 1, wherein the delay amount calculation unit calculates the transmission delay amount each time a predetermined calculation timing arrives, and
wherein the delay amount addition unit determines whether or not a currently calculated transmission delay amount is equal to or greater than a threshold value each time the transmission delay amount is calculated, and delays the first acoustic signal using the currently calculated transmission delay amount in a case where the currently calculated transmission delay amount is equal to or greater than the threshold value.

5. The signal processing method according to claim 1, wherein the delay amount calculation unit calculates the transmission delay amount each time a predetermined calculation timing arrives, and
wherein the delay amount addition unit determines whether or not a currently calculated transmission delay amount is equal to or greater than a threshold value each time the transmission delay amount is calculated, and delays the first acoustic signal using a predetermined delay amount in a case where the currently calculated transmission delay amount is not equal to or greater than the threshold value.

6. The signal processing method according to claim 4, wherein the threshold value is an average of transmission delay amounts calculated at the predetermined calculation timing.

7. The signal processing method according to claim 1, wherein the delay amount calculation unit calculates the transmission delay amount each time a predetermined calculation timing arrives, and
wherein the delay amount addition unit delays the first acoustic signal in a stepwise manner based on a previously calculated transmission delay amount and a currently calculated transmission delay amount calculated at the predetermined calculation timing.

8. The signal processing method according to claim 1, wherein the delay amount calculation unit calculates a delay amount that maximizes a cross-correlation value between a time-series variation of the first acoustic signal and a time-series variation of the second acoustic signal received in a predetermined time section, and sets the calculated delay amount as the transmission delay amount in a case where the calculated delay amount is equal to or greater than a threshold value.

9. The signal processing method according to claim 8, wherein the delay amount calculation unit does not calculate the transmission delay amount in a case where a maximum level of the first acoustic signal received in the predetermined time section is less than the threshold value and a maximum level of the second acoustic signal is equal to or greater than the threshold value.

10. The signal processing method according to claim 8, wherein the delay amount calculation unit does not calculate the transmission delay amount in a case where a maximum level of the first acoustic signal received in the predetermined time section is equal to or greater than the threshold value and a maximum level of the second acoustic signal is less than the threshold value.

11. A signal processing device, comprising:
a first reception unit configured to receive an acoustic signal transmitted via a first transmission path, the acoustic signal received by the first reception unit being a first acoustic signal;
a second reception unit configured to receive the acoustic signal transmitted via a second transmission path different from the first transmission path, the second transmission path having a longer delay time for transmission than the first transmission path, and the acoustic signal received by the second reception unit being a second acoustic signal;

a delay amount calculation unit configured to calculate a transmission delay amount that is a relative delay amount between the first acoustic signal and the second acoustic signal;

a delay amount addition unit configured to delay the first acoustic signal based on the calculated transmission delay amount; and an output unit configured to output the delayed first acoustic signal.

12. The signal processing device according to claim 11, wherein the second reception unit is configured to receive a video signal transmitted via the second transmission path along with the acoustic signal.

13. The signal processing device according to claim 11, wherein the delay amount calculation unit is configured to calculate the transmission delay amount each time a predetermined calculation timing arrives, and wherein the delay amount addition unit is configured to delay the first acoustic signal using the calculated transmission delay amount each time the transmission delay amount is calculated.

14. The signal processing device according to claim 11, wherein the delay amount calculation unit is configured to calculate the transmission delay amount each time a predetermined calculation timing arrives, and wherein the delay amount addition unit is configured to determine whether or not a currently calculated transmission delay amount is equal to or greater than a threshold value each time the transmission delay amount is calculated, and is configured to delay the first acoustic signal using the currently calculated transmission delay amount in a case where the currently calculated transmission delay amount is equal to or greater than the threshold value.

15. The signal processing device according to claim 11, wherein the delay amount calculation unit is configured to calculate the transmission delay amount each time a predetermined calculation timing arrives, and wherein the delay amount addition unit is configured to determine whether or not a currently calculated transmission delay amount is equal to or greater than a threshold value each time the transmission delay amount is calculated, and is configured to delay the first acoustic signal using a predetermined delay amount in a case where the currently calculated transmission delay amount is not equal to or greater than the threshold value.

16. The signal processing device according to claim 14, wherein the threshold value is an average of transmission delay amounts calculated at the predetermined calculation timing.

17. The signal processing device according to claim 11, wherein the delay amount calculation unit is configured to calculate the transmission delay amount each time a predetermined calculation timing arrives, and wherein the delay amount addition unit is configured to delay the first acoustic signal in a stepwise manner based on a previously calculated transmission delay amount and a currently calculated transmission delay amount calculated at the predetermined calculation timing.

18. The signal processing device according to claim 11, wherein the delay amount calculation unit is configured to calculate a delay amount that maximizes a cross-correlation value between a time-series variation of the first acoustic signal and a time-series variation of the second acoustic signal received in a predetermined time section, and is configured to set the calculated delay amount as the transmission delay amount in a case where the calculated delay amount is equal to or greater than a threshold value.

19. The signal processing device according to claim 18, wherein the delay amount calculation unit is configured not to calculate the transmission delay amount in a case where a maximum level of the first acoustic signal received in the predetermined time section is less than the threshold value and a maximum level of the second acoustic signal is equal to or greater than the threshold value.

20. A non-transitory computer readable recording medium that stores computer-executable instructions that, when executed, cause the computer to execute:

a first reception step of receiving an acoustic signal transmitted via a first transmission path, the acoustic signal received by the first reception unit being a first acoustic signal;

a second reception step of receiving the acoustic signal transmitted via a second transmission path different from the first transmission path, the second transmission path having a longer delay time for transmission than the first transmission path, and the acoustic signal received by the second reception unit being a second acoustic signal;

a delay amount calculation step of calculating a transmission delay amount that is a relative delay amount between the first acoustic signal and the second acoustic signal; and a delay amount addition step of delaying the first acoustic signal based on the calculated transmission delay amount; and an outputting step of outputting the delayed first acoustic signal.

* * * * *